(12) United States Patent
Xu et al.

(10) Patent No.: US 9,128,292 B2
(45) Date of Patent: Sep. 8, 2015

(54) BALANCED EQUATORIAL MOUNT TECHNIQUE FOR TELESCOPE

(71) Applicant: Nanjing iOptron Scientific, Inc. Ltd., Nanjing, Jingsu (CN)

(72) Inventors: Ning Xu, Jiangsu (CN); Deshun Chen, Jiangsu (CN); Yingyin Kevin Zou, Lexington, MA (US)

(73) Assignee: Nanjing iOptron Scientific, Inc. Ltd., Nanjing (CN)

( * ) Notice: Subject to any disclaimer, the term of this patent is extended or adjusted under 35 U.S.C. 154(b) by 136 days.

(21) Appl. No.: 13/899,140

(22) Filed: May 21, 2013

(65) Prior Publication Data

US 2014/0111853 A1    Apr. 24, 2014

(30) Foreign Application Priority Data

Oct. 18, 2012 (CN) .......................... 2012 1 0396330

(51) Int. Cl.
G02B 23/16    (2006.01)
(52) U.S. Cl.
CPC .............. *G02B 23/165* (2013.01); *G02B 23/16* (2013.01)

(58) Field of Classification Search
CPC .............................. G02B 23/16; G02B 23/165
See application file for complete search history.

(56) References Cited

U.S. PATENT DOCUMENTS 3,942,865 A    3/1976   Rand
5,437,427 A    8/1995   Johnson
5,537,250 A *  7/1996   Masunaga et al. ............ 359/430

OTHER PUBLICATIONS

"Star Lapse: Astronomical & Terrestrial Camera Motion System," Losmandy® Astronomical Products, 16 pages.
"Starlapse: Astronomical & Terrestrial Camera Motion System," Advanced Telescope Supplies, dowloaded from http://www.atscope.com.au/losmandy/starlapse.html, downloaded on May 23, 2013, 7 pages.

* cited by examiner

*Primary Examiner* — Joseph P Martinez
(74) *Attorney, Agent, or Firm* — BainwoodHuang

(57) ABSTRACT

A technique for equatorially mounting a telescope includes a right ascension support having a first end coupled to a counterweight assembly and a second end coupled to a declination support. The right ascension support is coupled to a base and extends downwardly and backwardly from the first end to the second end. The resulting arrangement causes the act of balancing the telescope about its right ascension axis also substantially to balance the telescope about its base.

20 Claims, 4 Drawing Sheets

BALANCED EQUATORIAL MOUNT TECHNIQUE FOR TELESCOPE

Priority is claimed to Chinese patent application number 201210396330.8, filed Oct. 18, 2012. The contents and teachings of this prior application are incorporated herein by reference in their entirety.

BACKGROUND

Equatorial mounts have long been used for carrying telescope optical assemblies and providing single-axis tracking of celestial objects. FIG. 1 shows a telescope 100 that includes a conventional equatorial mount 120, known in the art as a German equatorial mount. The equatorial mount 120 carries an optical assembly 110 on a cradle or clamp 130. A right ascension support 122 allows the optical assembly 110 to be rotated, e.g., on bearings 124, about a right ascension axis 126. In a similar fashion, a declination axis support 132 allows the optical assembly 110 to be rotated, e.g., on bearings 134, about a declination axis 136. A counterweight shaft 140 extends from the declination support 132, and a counterweight 142, e.g., made of steel or some other heavy material, is attached to the counterweight shaft 140.

The equatorial mount 120 sits on a base 150, which in turn sits on a support, such as a tripod 180, pedestal, or some other support. The base 150 provides a latitude adjustment 152, which allows the mount 120 to be tilted up or down, as indicated by the arrows 156, about a point 154. An operator may initially set the angle of the latitude adjustment approximately to the latitude where the telescope 100 is operated.

To enable single-axis tracking of celestial objects, the operator may perform a polar alignment of the equatorial mount 120. For example, the operator may point the right ascension axis 126 toward a celestial pole (e.g., toward Polaris in the Northern Hemisphere or toward sigma Octantis in the Southern Hemisphere), look through a polar scope 128, and vary the latitude adjustment 154 to place the celestial pole in the center of the field of view of the polar scope 128 (often designated using cross-hairs). The operator may lock the latitude adjustment at the established position.

The operator may then balance the telescope 100. For example, the operator may rotate the telescope 100 in right ascension so that the counterweight shaft 140 is parallel to the ground and then move the counterweight 142 along the shaft 140 to find a placement of the counterweight 142 that approximately balances the weight of the optical assembly 110. Balancing may be repeated if heavy eyepieces or photographic equipment are used. The operator may also balance the telescope 100 in declination, by moving the optical assembly 110 forward or back on the cradle or clamp 130. Once balanced, the equatorial mount 120 can hold any established position with minimal frictional braking and can be moved back and forth along each of its axes 126 and 136 by applying about the same amount of torque in each direction.

SUMMARY

Unfortunately, the conventional German equatorial mount 120 is not balanced about the base 150. Indeed, most of the weight of the mount 120 and optical assembly 110 is generally toward the front of the telescope 100, causing a substantial bending moment 158 to be applied about the point 154. Recognizing this, manufacturers typically make the base 150 and latitude adjustment 152 out of heavy, strong components, to resist the bending moment 158 and to hold any operator-established latitude adjustments accurately without sagging.

Because the latitude adjustment 152 is heavily loaded to resist the bending moment 158, performing the latitude adjustment when polar aligning generally requires a special tool to apply leverage for raising and lowering the latitude setting. The large bending moment 158 can also affect stability. For example, in some configurations, an accidental bump from behind may cause the telescope 100 to tip forward.

In contrast with conventional telescope mounts, an improved technique for equatorially mounting a telescope includes a right ascension support having a first end coupled to a counterweight assembly and a second end coupled to a declination support. The right ascension support is coupled to a base and extends downwardly and backwardly from the first end to the second end. The resulting arrangement causes the act of balancing the telescope about its right ascension axis also substantially to balance the telescope about the base. The improved telescope mount thus has no large bending moments to resist, enabling the base and any latitude adjustment components to be made smaller and lighter than those of conventional designs, and in some cases to be operated by hand, i.e., without any special tool to provide leverage. Telescope mounts made according to this technique may thus be made lighter, more portable, easier to align, and more stable than prior designs.

Certain embodiments are directed to a telescope mount for pointing an optical assembly. The telescope mount includes a base and a right ascension support coupled to the base. The right ascension support has a first end and a second end and extends downwardly and backwardly from the first end to the second end. A counterweight assembly is coupled to the right ascension support at the first end of the right ascension support, and a declination support is coupled to the right ascension support at the second end of the right ascension support. The right ascension support is constructed and arranged to effect rotation of the optical assembly about a right ascension axis of the telescope mount and the declination support is constructed and arranged to effect rotation of the optical assembly about a declination axis of the telescope mount.

Other embodiments are directed to a telescope employing a telescope mount as described above. Still other embodiments are directed to a method of balancing such a telescope.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for equatorially mounting a telescope includes a right ascension support having a first end coupled to a counterweight assembly and a second end coupled to a declination support. The right ascension support is coupled to a base and extends downwardly and backwardly from the first end to the second end. The resulting arrangement causes the act of balancing the telescope about its right ascension axis also substantially to balance the telescope about the base.

Figure 1:
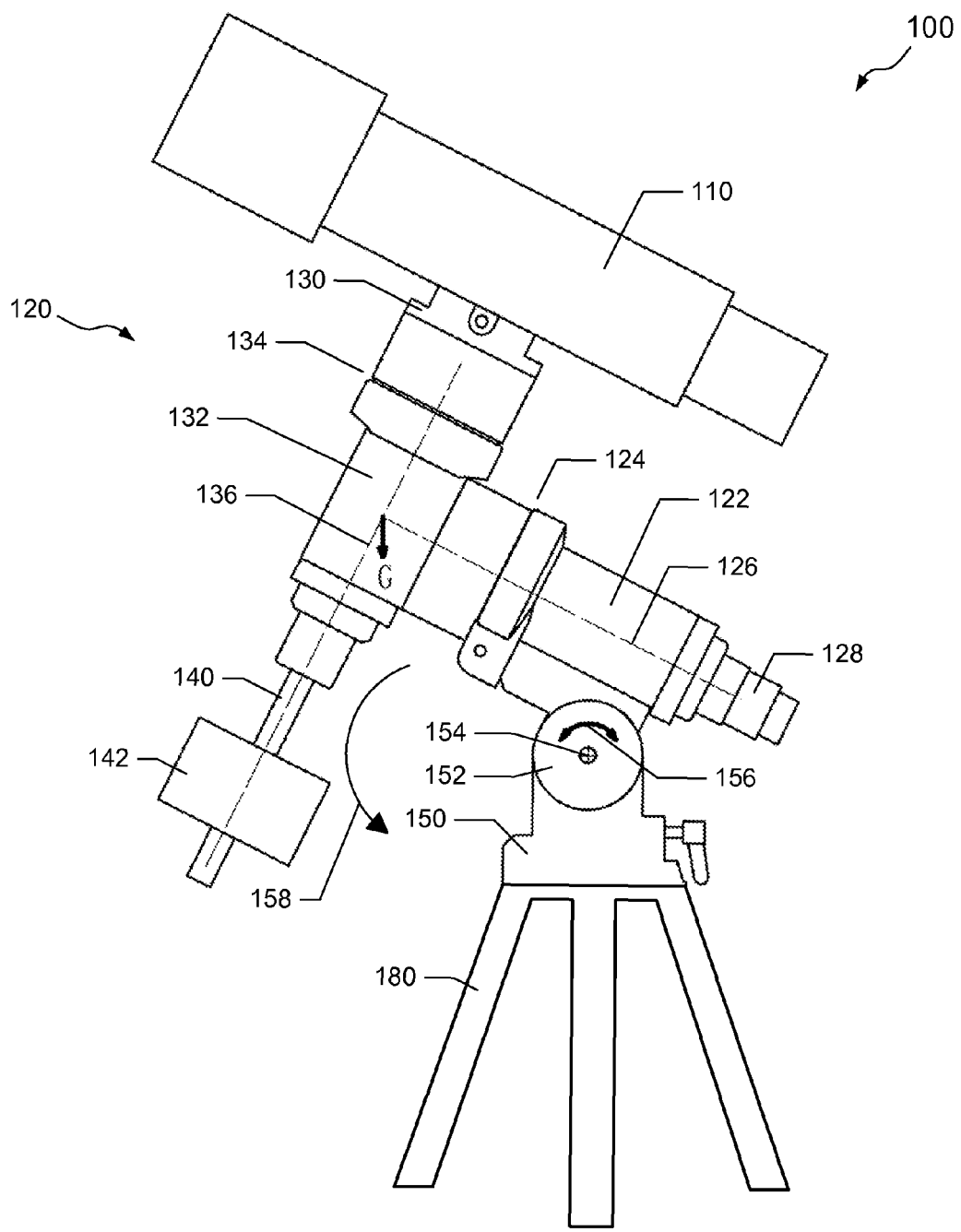
FIG. 1 is a side elevation view of a telescope having a conventional German equatorial mount.
Figure 2:
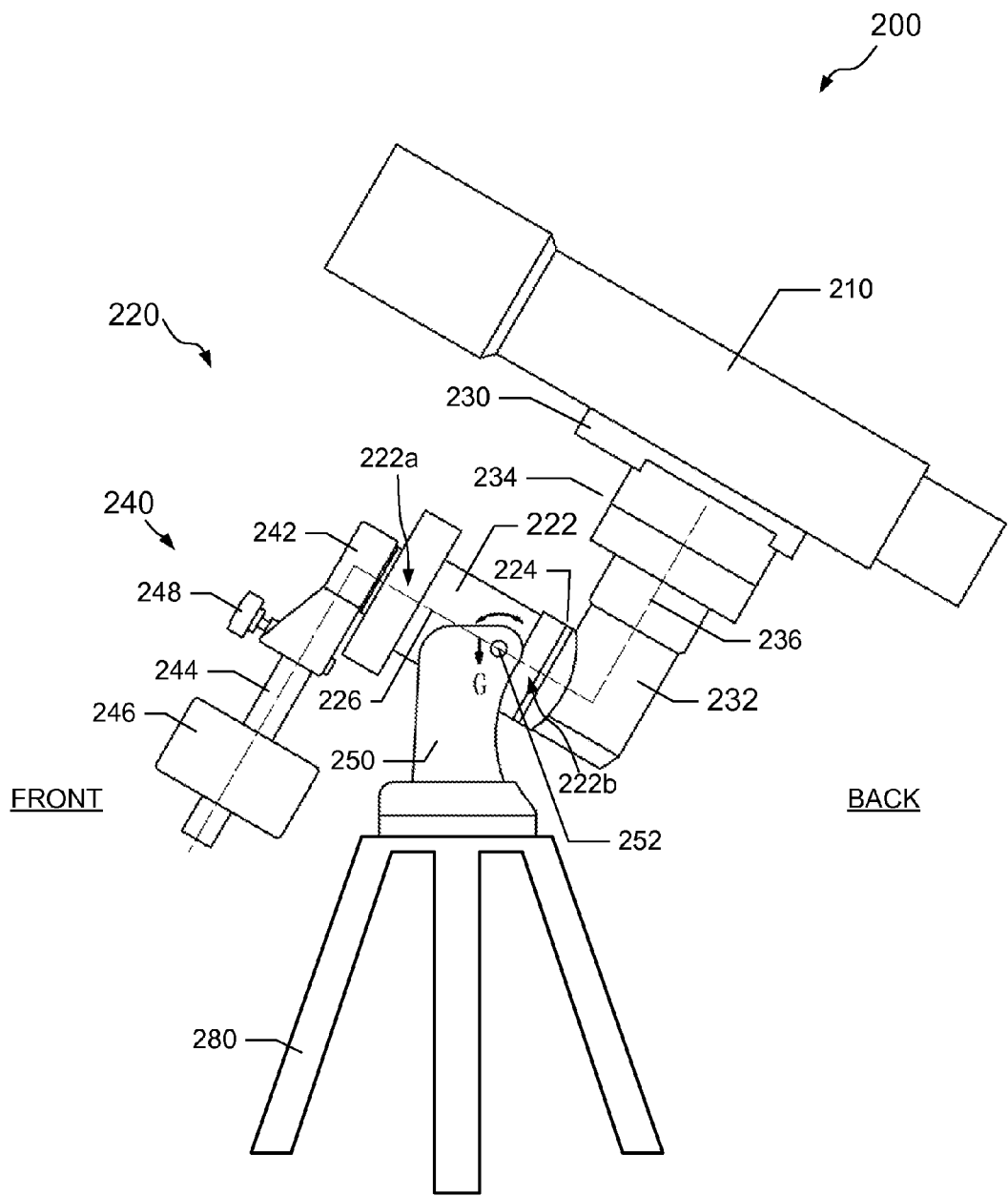
FIG. 2 is a side elevation view of a telescope having an example equatorial mount in accordance with and embodiment of the invention.

FIG. 2 shows an example telescope 200 in which improvements hereof may be practiced. The telescope 200 is seen to include an optical assembly 210, a cradle or clamp 230, an example telescope mount 220, and a tripod 280. As shown, the telescope mount 220 includes a base 250, a right ascension support 222, a declination support 232, and a counterweight assembly 240. The base 250 (oriented upright in this view) is attached to the tripod 280. As indicated by the "FRONT" and "BACK" designations, the right ascension support 222 can be seen to extend downwardly and backwardly from a first end 222a to a second end 222b.

The right ascension support 222 is coupled to the counterweight assembly 240 at the first end 222a and is coupled to the declination support 232 at the second end 222b. The optical assembly 210 can be rotated about a right ascension axis 226 via bearings 224 and can be rotated about a declination axis 236 via bearings 234. As will be described, additional couplings are provided to link the declination support 232 to the counterweight assembly 240, such that rotation of the declination support 232 effects a corresponding rotation of the counterweight assembly 240.

The counterweight assembly 240 includes an adapter 242, a counterweight shaft 244 and a counterweight mass 246. The adapter 242 has an adjustment mechanism (including, for example, a knob 248), which may be operated to pivot the counterweight shaft 244 forward and back. Such pivoting of the counterweight shaft 244 may be helpful at low latitudes to avoid interference between the counterweight mass 246 and legs of the tripod 280.

In the example shown, the right ascension support 222 is attached to the base 250 at a set of attachment points 252. Although only one attachment point 252 is shown, it is understood that a second attachment point 252 may be provided on an opposite side of the mount 220, with the two attachment points 252 aligned along a common axis that runs normal to the figure (e.g., the base 250 has two sides that form a yoke, and the yoke engages attachment points 252 on both sides). With this arrangement, the right ascension support 220 is held firmly from both sides and may be rotated about the axis formed by the attachment points 252 to establish polar alignment at different latitudes. Small telescopes may be able to suffice with only a single attachment point 252. In the example shown, the base 250 is bolted, clamped, or otherwise attached to the right ascension support 222 on each side of the right ascension support 222, but any such attachments may be loosened temporarily to allow for polar alignment.

In some examples, the right ascension support 222 includes a lower region (not shown) that extends down from the right ascension support. The lower region has a through hole, and a single bolt or rod is extended through the hole to fasten the base 250 to the right ascension support 222.

It is evident from FIG. 2 that the telescope mount 220 enables a single counterweight mass 246 to achieve balance both about the right ascension axis 226 and about the base 250 (e.g., about the axis formed between the attachment points 252). The placement of the counterweight mass 246 to achieve perfect balance about the right ascension axis 226 also substantially balances the bending moments about the base 250. Thus, no large bending moment is produced about the base 250 and the base 250 need not be constructed to resist large bending moments. The base 250 can thus be made smaller and lighter than bases used in previous designs.

Figure 3:
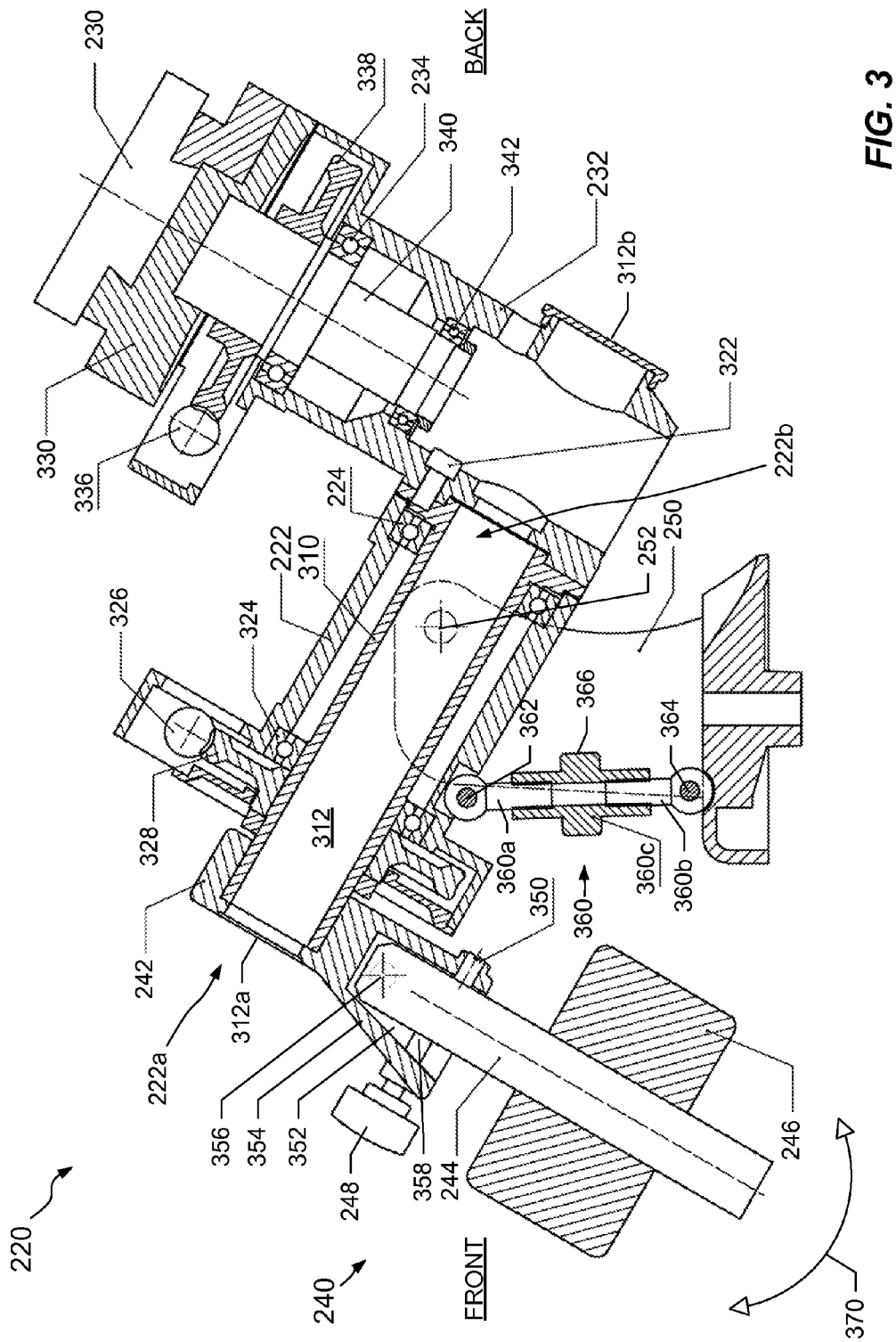
FIG. 3 is a cross-sectional view of the example equatorial mount of FIG. 2.

FIG. 3 shows additional details of the example telescope mount 220. Here, it is seen that the telescope mount 220 includes a connecting member 310. The connecting member 310 is fixedly attached to the counterweight adapter 242 at the first end 222a of the right ascension support 222 and extends through the right ascension support 222 to the second end 222b, where the connecting member 310 is fixedly attached to the declination support 232. The connecting member 310 is able to rotate within the right ascension support 222 on the bearing assemblies 324 and 224, located near the first and second ends 222a and 222b of the right ascension support 222, respectively. Rotating the declination support 232 about the right ascension axis 226 thus effects rotation of the counterweight assembly 240, and vice-versa. The connecting member 310 thus links together the declination support 232 and the counterweight assembly 240, such that the two rotate in right ascension as a unit. A right ascension lock 322, disposed near the bearings 224, may be advanced or retracted selectively to lock the declination support 232 to the right ascension support 222, thus preventing rotation about the right ascension axis 226.

In an example, a gear assembly is coupled to the connecting member 310 and to the right ascension support 222 for allowing motorized tracking and/or fine position control of the telescope 100 about the right ascension axis 226. For example, a worm wheel 328 is attached to the connecting member 310 and a worm gear shaft 326 is attached to the right ascension support 222. Rotating the worm gear shaft 326 causes the connecting member 310, and thus the optical assembly 210, to rotate in right ascension.

A separate gear assembly may provide fine rotation control about the declination axis 236. For example, a worm wheel 338 is attached to the cradle/clamp 230 (via shaft 340 and supplemental support 330) and a worm gear shaft 336 is attached to the declination support 232. Rotating the worm gear shaft 336 causes the worm wheel 338 to rotate the shaft 340 (on bearings 234 and 342), and thus to rotate the optical assembly 210 in declination.

In an example, the connecting member 310 is a hollow structure (e.g., a tube), and the telescope mount 220 further includes a polar scope 312. The polar scope 312 has an objective lens 312a and an eyepiece 312b, which are aligned coaxially with the connecting member 110. The polar scope 312 has an optical path that extends through the connecting member 310 and holes in the counterweight adapter 242 and declination support 232. Operators can thus look through the eyepiece 312b and have a clear line of sight for performing polar alignment.

FIG. 3 also shows the counterweight assembly 240 in additional detail. In the arrangement shown, the counterweight shaft 244 extends at about 90 degrees to the right ascension axis 226. The adapter 242 includes a pocket 352 that receives an end of the counterweight shaft 244. The pocket 352 has a front wall 354, which slopes generally down and forward. In an example, a screw 358, which is attached to the knob 248 at one end, extends through a hole in the front wall 354 and has a shank that engages the counterweight shaft 244. Turning the knob 248 in a first direction (e.g., clockwise) causes the shank of the screw 358 to advance within the shaft 244, which has the effect of pulling the shaft 244 toward the knob 248 such that the shaft 244 pivots forward in the pocket 352. The shaft 244 can pivot to an angle substantially greater than 90 degrees from the right ascension axis 226, such as to 110 degrees, for example. Turning the knob 248 in a second direction (e.g., counterclockwise) causes the shank of the screw 358 to retract within the shaft 244 and thus to move the shaft 244 back toward the 90-degree position (motion of the shaft 144 is shown via arrows 370). The hole in the front wall 354 may have the shape of a vertical slot, to allow the screw 358 to pivot up and down as the shaft 244 pivots forward and back. Here, the screw 358 may be threaded directly into a tapped hole in the shaft 244.

In an example, a transverse hole is placed in the end of the shaft 244 at location 356. A screw or rod may be inserted through the walls of the adapter 242 (normal to the figure) and through the hole at the location 356, essentially to hang the counterweight shaft 244 within the pocket 352. In some examples, an adjustable stop 350 is provided on a back wall of the adapter 242. The adjustable stop 350 may be threaded into the back wall of the adapter 242 and advanced or retracted to establish a desired minimum angle of the shaft 244 with the right ascension axis 226. For example, if it is known that the counterweight mass 246 hits a leg of the tripod 280 when pointing the mount 220 in a particular direction, the stop 350 may be advanced to limit the angle of the shaft 244 so as to avoid ever hitting the tripod leg.

In other examples, the screws 350 and 358 operate together in a push-pull arrangement, with neither screw threading into the shaft 244. In these examples, one screw is advanced as the other is retracted, such that both screws 350 and 358 are made to press firmly against the shaft 244 and to prevent pivoting forward or back.

FIG. 3 also shows a latitude control 360. The latitude control 360 is seen to include a first portion 360a, a second portion 360b, and a third portion 360c. The first and second portions 360a and 360b of the latitude control 360 may each be provided in the form of a threaded rod that terminates in a ring. The ring of the first portion 360a is attached to the right ascension support 222 to form a first hinge joint 362, which allows the first portion 360a to rotate in a clockwise/counter-clockwise direction. Similarly, the ring of the second portion 360b is attached to the base 250 to form a second hinge joint 364, to enable rotation in a similar manner. The first and second portions 360a and 360b each are threaded into the third portion 360c, allowing the latitude control 360 to operate essentially as a turnbuckle.

In an example, the third portion 360c of the latitude control 360 has a knurled grip 366, which enables the third portion 360c to be rotated by hand. For example, turning the third portion 360c of the latitude control 360 in one direction raises the elevation of the mount 220 for use in higher latitudes, and turning the third portion 360c of the latitude control 360 in the opposite direction lowers the elevation of the mount 220 for use in lower latitudes. Because the telescope mount 220 is substantially balanced about the base 250 (and more particularly about the axis formed by the attachment points 252), the latitude control 360 can generally be operated by hand, without requiring any special tools for applying leverage. Once the desired latitude is set, one or more clamps (not shown) may be applied to hold the base 250 at the adjusted setting.

The telescope mount 220 as a whole is also compact. Compactness is achieved by virtue of the base 250 attaching approximately at the center of the mount 220 and by virtue of the counterweight assembly 250 being disposed close to the base 250. Because the counterweight shaft 244 extends away from the tripod 280 (as shown) and because the counterweight shaft 244 may be pivoted forward, the distance between the base 250 and the counterweight assembly 240 may be kept to a minimum without risking interference between the counterweight assembly 240 and the tripod 280. For example, the counterweight assembly 240 may be located immediately adjacent to the worm gears 326/328. The compactness of the mount 220 promotes ease of storage and use, and, in some examples, enables to mount 222 to carry large payloads in proportion to its size.

Figure 4:
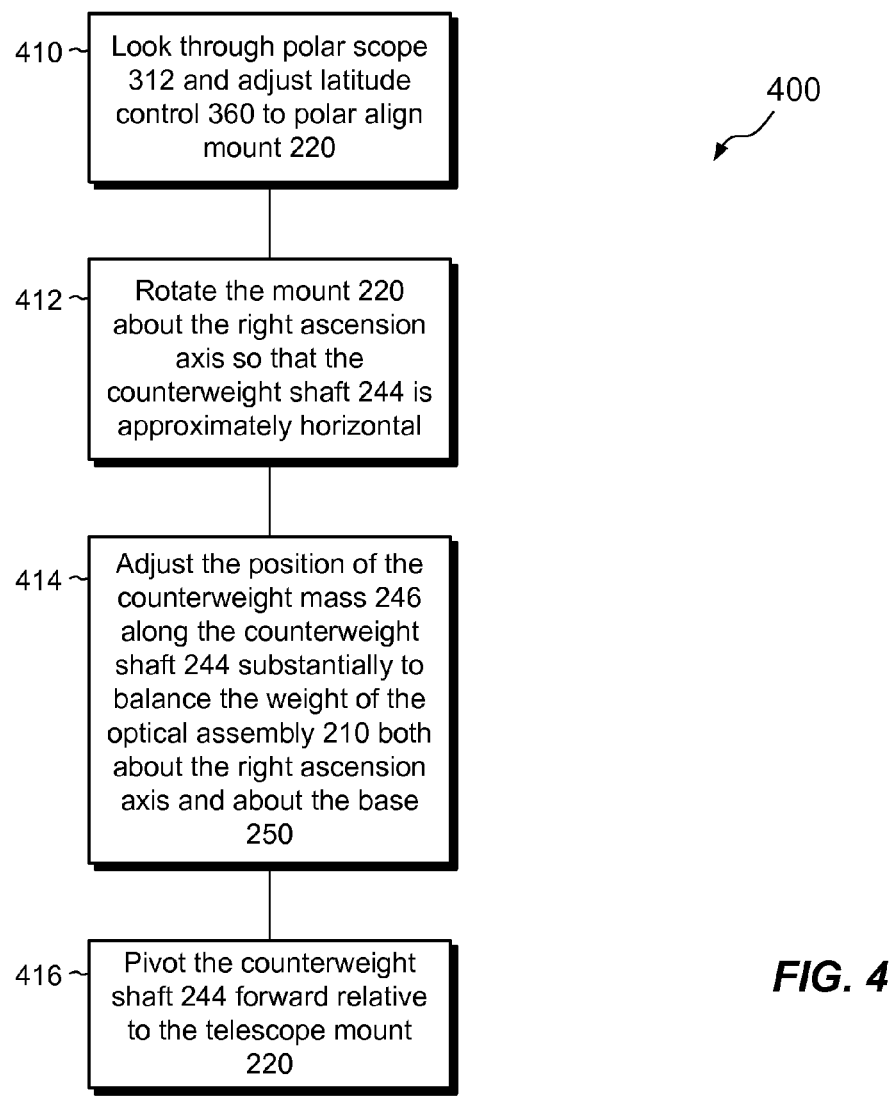
FIG. 4 is a flowchart showing an example process for balancing and aligning a telescope mount as in FIGS. 2 and 3.

FIG. 4 shows an example process 400 that may be performed for balancing a telescope and performing other adjustments. The process 400 may be carried out on the telescope 200, which is equipped with a telescope mount 220 such as that shown in FIGS. 2 and 3. The various acts of the process 400 may be ordered in any suitable way. Accordingly, embodiments may be constructed in which acts are performed in orders different from those illustrated, which may include performing some acts simultaneously, even though the acts are shown as sequential in FIG. 4. Not all acts shown in FIG. 4 are required to be performed in all instances.

At step 410, and operator looks through the polar scope 312 and adjusts the latitude control 360 to polar align the mount 220. For example, the operator may look through the polar scope 312 and observe an illuminated reticule superimposed over background stars. The operator may vary the latitude control 360 and/or the orientation of the telescope mount 220 and center the celestial pole (north or south) based on images observed through the polar scope 312.

At step 412, the operator may rotate the telescope mount 220 about the right ascension axis 226 so that the counterweight shaft 244 is oriented approximately horizontally. The operator should be sure to unlock the right ascension axis, e.g., by retracting the lock 322, prior to performing this step.

At step 414, the operator adjusts the position of the counterweight mass 246 along the counterweight shaft 244 substantially to balance the weight of the optical assembly 210 (and, to some extent, the weight of the mount 220 itself) both about the right ascension axis 226 and about the base 250. Typically, the operator consciously attempts only to balance the optical assembly 210 about the right ascension axis 226. The operator finds an optimal location of the counterweight mass 246 that equalizes the torque that must be applied to rotate the mount 220 in both directions of right ascension and locks the counterweight mass 246 in place (e.g., by turning a knob). However, owing to the geometrical arrangement of the mount 220, the act of balancing the mount 220 about the right ascension axis 226 also substantially balances the mount 220 about the base 250, e.g., about the axis formed by the attachment points 252. Small errors in the balance of the mount 220 about the base 250 may remain after balancing the mount 220 in right ascension; however, such errors are of little operational consequence, as no rotation is typically provided about the attachment points 352 during normal use. Despite any small imbalances that remain, the mount 220 still greatly improves balance compared with prior designs, and may allow the base 250 and latitude control 360 to be made from smaller, lighter components, and may allow the latitude control 360 to be operated by hand rather than requiring the use of tools.

At step 416, the operator pivots the counterweight shaft 244 forward relative to the telescope mount 220. For example, the operator may turn the knob 248 to advance the shaft 244 to assume an angle greater than 90 degrees from the right ascension axis 226. Step 416 may be performed in response to the counterweight shaft 244 or mass 246 mechanically interfering with a leg of the tripod 280, or interfering with a pedestal base, at low latitudes. In addition, step 416 may be performed to effect a fine adjustment of the balance across the base 250. For example, the counterweight shaft 244 may be pivoted forward several degrees, which may have a large effect on balance across the base 250 but a small effect on balance about the right ascension axis 226. In some examples, an iterative process can be conducted by adjusting both the position of the counterweight mass 246 and the pivot of the counterweight shaft 244 to balance the mount 220 nearly perfectly both about the right ascension axis 226 and across the base 250. It is emphasized, however, that perfect balance across the base 250 is usually not required or desired, as long as approximate balance can be achieved.

An improved equatorial telescope mount 220 has been described, which includes a right ascension support 222 having a first end 222a coupled to a counterweight assembly 240 and a second end 222b coupled to a declination support 232. The right ascension support 222 is coupled to a base 250 and extends downwardly and backwardly from the first end 222a to the second end 222b. The resulting arrangement causes the act of balancing the telescope about its right ascension axis 226 also substantially to balance the telescope about its base 250. The improved telescope mount 220 thus has no large bending moments to resist, enabling the base 250 and any latitude adjustment components (e.g., latitude control 360) to be made smaller and lighter than those of conventional designs, and in some cases to be operated by hand, i.e., without any special tool to provide leverage. The telescope mount 220 may thus be made lighter, more portable, easier to align, and more stable than prior designs.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Having described certain embodiments, numerous alternative embodiments or variations can be made. For example, the telescope mount 220 has been shown and described for use with a tripod 280. However, it may also be used with a pedestal or other type of support.

Also, it has been shown and described that the base 250 attaches to the right ascension support 222 at a set of attachment points 252, which are disposed at fixed locations on the right ascension support 222. However, such attachment points 252 may also be moveable. For example, a pair of tracks or slots may be provided on each side of the right ascension support 222, and the mount 220 may be moved along the tracks or slots relative to the base 250 and clamped to a desired location. The use of tracks or slots provides an additional degree of freedom for finding an optimal balance across the base 250.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A telescope mount for pointing an optical assembly, comprising:
   a base:
   a right ascension support coupled to the base and having a first end and a second end, the right ascension support extending downwardly and backwardly from the first end to the second end when the base is oriented upright;
   a counterweight assembly coupled to the right ascension support at the first end of the right ascension support;
   a declination support coupled to the right ascension support at the second end of the right ascension support, and
   a connecting member attached to the counterweight assembly at the first end of the right ascension support and to the declination support at the second end of the right ascension support to effect linked rotation of the counterweight assembly and the declination support together about the right ascension axis,
   wherein the right ascension support is constructed and arranged to effect rotation of the optical assembly about a right ascension axis of the telescope mount and the declination support is constructed and arranged to effect rotation of the optical assembly about a declination axis of the telescope mount, and
   wherein the connecting member is hollow and wherein the telescope mount further comprises a polar scope having an eyepiece disposed within the declination support and an optical path that passes axially through the connecting member.

2. The telescope mount of claim 1, wherein the counterweight assembly includes a counterweight adapter fixedly attached to the connecting member, a counterweight shaft extending from the counterweight adapter, and a counterweight mass attached to the counterweight shaft, wherein the position of the counterweight mass is moveable along the counterweight shaft for balancing the telescope mount about the right ascension axis.

3. The telescope mount of claim 2, wherein the counterweight adapter includes an adjustment mechanism coupled to the counterweight shaft and configured to pivot the counterweight shaft within the counterweight adapter, such that the counterweight shaft is made to form an angle substantially greater than 90 degrees with the right ascension axis.

4. The telescope mount of claim 3, wherein the counterweight mass substantially balances the weight of the optical assembly both (i) about the right ascension axis and (ii) about the base.

5. The telescope mount of claim 2, wherein the counterweight adapter includes:
   a pocket that receives an end of the counterweight shaft, the pocket having a front wall; and
   a screw having an end attached to a knob and a shank extending through the front wall and engaging the counterweight shaft within the pocket,
   wherein turning the knob causes the counterweight shaft to pivot forward within the pocket to establish the angle greater than 90 degrees with the right ascension axis.

6. The telescope mount of claim 5, wherein turning the knob in an opposite direction causes the counterweight shaft to pivot backward within the pocket to establish an angle with the right ascension axis that substantially equals 90 degrees.

7. The telescope mount of claim 1, wherein the counterweight assembly includes a counterweight shaft that is adjustable to pivot, such that the counterweight shaft forms an angle substantially greater than 90 degrees with the right ascension axis.

8. The telescope mount of claim 1, further comprising a worm shaft coupled to the right ascension support near the first end of the right ascension support and a worm wheel coupled to the connecting member, the worm shaft engaged with the worm wheel for effecting rotation of the connecting member relative to the right ascension support.

9. The telescope mount of claim 1, further comprising a latitude control having a first end coupled to the base and a second end coupled to the right ascension support, the latitude control constructed and arranged to vary the angle of the right ascension support relative to the base.

10. A telescope mount for pointing an optical assembly, comprising:
a base:
a right ascension support coupled to the base and having a first end and a second end, the right ascension support extending downwardly and backwardly from the first end to the second end when the base is oriented upright;
a counterweight assembly coupled to the right ascension support at the first end of the right ascension support;
a declination support coupled to the right ascension support at the second end of the right ascension support,
a connecting member attached to the counterweight assembly at the first end of the right ascension support and to the declination support at the second end of the right ascension support to effect linked rotation of the counterweight assembly and the declination support together about the right ascension axis,
a first bearing assembly coupling the connecting member to the right ascension support at the first end of the right ascension support;
a second bearing assembly coupling the connecting member to the right ascension support at the second end of the right ascension support; and
a worm gear assembly including a worm shaft coupled to the right ascension support near the first end of the right ascension support and a worm wheel coupled to the connecting member, the worm shaft engaged with the worm wheel for effecting rotation of the connecting member relative to the right ascension support,
wherein the right ascension support is constructed and arranged to effect rotation of the optical assembly about a right ascension axis of the telescope mount and the declination support is constructed and arranged to effect rotation of the optical assembly about a declination axis of the telescope mount.

11. A telescope mount for pointing an optical assembly, comprising:
a base:
a right ascension support coupled to the base and having a first end and a second end, the right ascension support extending downwardly and backwardly from the first end to the second end when the base is oriented upright;
a counterweight assembly coupled to the right ascension support at the first end of the right ascension support;
a declination support coupled to the right ascension support at the second end of the right ascension support, and
a connecting member attached to the counterweight assembly at the first end of the right ascension support and to the declination support at the second end of the right ascension support to effect linked rotation of the counterweight assembly and the declination support together about the right ascension axis,
wherein the right ascension support is constructed and arranged to effect rotation of the optical assembly about a right ascension axis of the telescope mount and the declination support is constructed and arranged to effect rotation of the optical assembly about a declination axis of the telescope mount,
wherein the base is attached to the right ascension support at a set of attachment points, and
wherein the telescope mount further comprises a latitude control having a first end coupled to the base and a second end coupled to the right ascension support in front of the set of attachment points.

12. The telescope mount of claim 11,
wherein the latitude control includes a first portion, a second portion, and a third portion,
wherein the first portion of the latitude control is attached to the base via a first hinge joint,
wherein the second portion of the latitude control is attached to the right ascension support via a second hinge joint,
wherein the first portion of the latitude control and the second portion of the latitude control are threaded into opposite ends of the third portion of the latitude control, the third portion of the latitude control having a knurled grip, and
wherein rotating the third portion of the latitude control via the knurled grip effects rotation of the right ascension support about the set of attachment points.

13. A telescope, comprising:
a tripod or pedestal;
a telescope mount attached to the tripod or pedestal; and
an optical assembly attached to the telescope mount, the telescope mount including—
a base;
a right ascension support coupled to the base and having a first end and a second end, the right ascension support extending downwardly and backwardly from the first end to the second end;
a counterweight assembly coupled to the right ascension support at the first end of the right ascension support; and
a declination support coupled to the right ascension support at the second end of the right ascension support,
wherein the right ascension support is constructed and arranged to effect rotation of the optical assembly about a right ascension axis of the telescope mount and the declination support is constructed and arranged to effect rotation of the optical assembly about a declination axis of the telescope mount,
wherein the counterweight assembly includes a counterweight mass attached to a counterweight shaft,
wherein the counterweight mass substantially balances the weight of the optical assembly both (i) about the right ascension axis and (ii) about the base, and
wherein the counterweight assembly includes an adjustment mechanism coupled to the counterweight shaft and configured to pivot the counterweight shaft forward and back to allow the counterweight shaft to extend forward at an angle substantially greater than 90 degrees from the right ascension axis.

14. The telescope of claim 13, further comprising a latitude control having a first end coupled to the base and a second end coupled to the right ascension support, the latitude control constructed and arranged to vary the angle of the right ascension support relative to the base.

15. The telescope of claim 13, further comprising a worm shaft coupled to the right ascension support and a worm wheel coupled to the declination support thought a connecting member, the worm shaft engaged with the worm wheel for effecting rotation of the connecting member relative to the right ascension support.

16. The telescope of claim 13, wherein the telescope mount further comprises a polar scope having an eyepiece disposed within the declination support and an optical path that passes axially through the right ascension support.

17. A method of balancing a telescope having a telescope mount for carrying an optical assembly, the telescope mount including:
- a base attached to a tripod or pedestal;
- a right ascension support coupled to the base and having a first end and a second end, the right ascension support extending downwardly and backwardly from the first end to the second end;
- a counterweight assembly coupled to the right ascension support at the first end of the right ascension support, the counterweight assembly including a counterweight shaft and a counterweight mass attached to the shaft;
- wherein the right ascension support is constructed and arranged to effect rotation of the optical assembly about a right ascension axis of the telescope mount and the declination support is constructed and arranged to effect rotation of the optical assembly about a declination axis of the telescope mount, the method comprising:
- adjusting the position of the counterweight mass along the counterweight shaft to substantially balance the weight of the optical assembly both about the right ascension axis and about the base,
- wherein the counterweight assembly includes an adjustment mechanism coupled to the counterweight shaft, and
- wherein the method further includes pivoting the counterweight shaft forward relative to the telescope mount to allow the counterweight shaft to extend forward at an angle substantially greater than 90 degrees from the right ascension axis.

18. The method of claim 17, wherein pivoting the counterweight shaft forward is effected by turning a knob extending from the counterweight assembly.

19. The method of claim 17, wherein pivoting the counterweight shaft forward is performed in response to there being a mechanical interference between the counterweight assembly and a tripod upon which the telescope mount is disposed.

20. The method of claim 17, further comprising:
- looking through a polar scope disposed within the right ascension support; and
- adjusting a latitude control of the telescope mount to polar align the telescope mount based on images observed through the polar scope.

\* \* \* \* \*